United States Patent [19]

Havlik et al.

[11] 3,805,914
[45] Apr. 23, 1974

[54] SEISMIC PNEUMATIC ENERGY PULSE GENERATORS FOR ATTENUATING SECONDARY PULSES

[75] Inventors: John J. Havlik; Billy H. Towell; Kenneth D. Shaub, all of Houston, Tex.

[73] Assignee: Texaco Inc., New York, N.Y.

[22] Filed: Mar. 6, 1972

[21] Appl. No.: 232,148

[52] U.S. Cl. ............................................. 181/.5 H
[51] Int. Cl. .............................................. G01v 1/04
[58] Field of Search .......... 181/.5 H, .5 XC, .5 NC; 340/15, 7, 3 T

[56] References Cited
UNITED STATES PATENTS

| | | |
|---|---|---|
| 3,187,831 | 7/1965 | Smith .................................. 340/37 |
| 3,525,416 | 8/1970 | Mott-Smith ....................... 181/.5 A |
| 3,276,534 | 10/1966 | Ewing .............................. 181/.5 H |
| 3,601,216 | 8/1971 | Mott-Smith ....................... 181/.5 H |
| 3,540,543 | 11/1970 | Bays ................................. 181/.5 H |

Primary Examiner—Benjamin A. Borchelt
Assistant Examiner—J. V. Doramus
Attorney, Agent, or Firm—T. H. Whaley; C. G. Ries

[57] ABSTRACT

A method for generating a seismic primary pulse with attenuated secondary pulses from a chamber of compressed air comprises forming the chamber into an elongated shape having two widely spaced apart areas, and exhausting the air in jets radiating from each of the areas to reduce the formation of a coherent air bubble. One seismic pneumatic energy pulse generator comprises an air gun with an elongated air chamber having a plurality of exhaust ports radiating from each end thereof and a long rod connecting the valve for the ports at one end with the valve for the ports at the other end for simultaneous opening of all exhaust ports. Modifications comprise extending the rod through one valve to connect to one or more other valves as the length of the chamber is increased.

11 Claims, 5 Drawing Figures

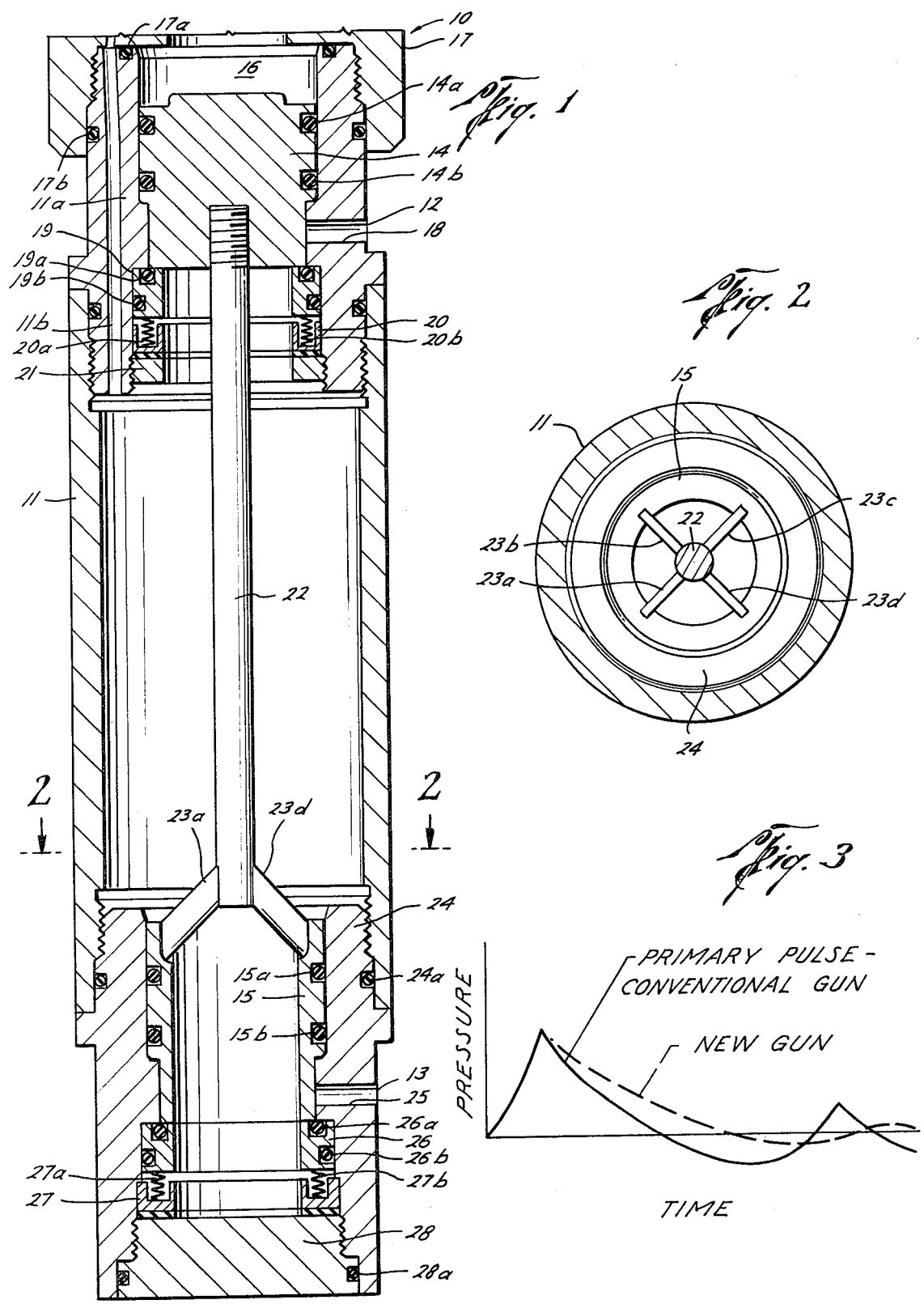

SEISMIC PNEUMATIC ENERGY PULSE GENERATORS FOR ATTENUATING SECONDARY PULSES

BACKGROUND OF THE INVENTION

Broadly the present invention relates to seismic exploration and to an improved pneumatic marine seismic energy pulse generator for the introduction of seismic energy into water in a conventional shot hole filled with water, marshy areas, or offshore from a floating vessel for supplying compressed air and having a geophysical crew thereon for exploring earth layers and formations underlying land or bodies of water as oceans, seas, lakes, rivers, or the like. More particularly this invention pertains to a method for reducing the formation of a coherent gas bubble resulting in attenuation of secondary pulses, and three seismic pneumatic energy generators for attenuating the secondary pulses and for lengthening the period of bubble pulses or secondary oscillations.

While the method and apparatuses of the invention are applicable for many purposes as will be set forth further below, they are illustratively disclosed and described as applied to water or mud filled shot holes and to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure waves travel down through the water to the ocean floor and are reflected as in the usual echo-sounding techniques. However, these waves also penetrate into the ocean floor and are reflected from the sub-strata. These acoustical waves also propagate horizontally through one or more geological strata and may be recorded at a distance from the source, thus providing useful refraction data on the stratum or strata involved. The same is true when making geological surveys from the sudden release of a volume of high pressure air into the surrounding earth, marsh, or water of a shot hole.

Although explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method and apparatuses for the present invention can be adjusted over an amplitude range and can be modified to provide the desired spectrum distribution of sound frequencies for the purpose at hand.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In most methods utilized, it is customary to either position one or more detectors on the ground surface or tow them through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously wherein the explosions themselves tend to kill much marine life, an example being disclosed in U. S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective attenuation of the signals' secondary oscillations.

The use of explosive gas mixture solves some of the problems that arise with dynamite, since explosive gas mixtures do not kill as much marine life, a further example being disclosed in U. S. Pat. No. 3,620,327. Normally, gas mixtures can be stored as separate, nonexplosive gases on the same vessel that contains the recording equipment. Thus, the need for an additional vessel or the possibility of killing marine life is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3-5 percent of the total electrical energy available in the capacitor bank is converted to useful acoustical energy in the water. Further, many spark electrodes in parallel may be used simultaneously as disclosed in U. S. Pat. No. 3,613,823.

Well known methods to attenuate the pulsation of energy bubbles consist in using a metallic sphere which is provided with a plurality of holes regularly distributed on its wall and in which the explosion is carried out, this sphere being made of a material which can withstand the explosion, as disclosed in U. S. Pat. Nos. 2,877,859 and 3,525,416. While, however, it is difficult to build such spheres having a sufficient mechanical strength to withstand numerous repeated explosions, complete attenuation of bubble pulse amplitude is still lacking. Another known device comprises a container with a resilient opening and closing element which provides an intermittent connection of the interior of the container with the surrounding liquid medium, as disclosed in U. S. Pat. No. 3,444,953. None of the above systems completely attenuate the amplitude of bubble pulsation or oscillations.

OBJECTS OF THE INVENTION

Accordingly, a primary object of this invention is to provide at least one method for attenuating the amplitude secondary pulses resulting from a generated seismic primary energy pulse.

Another primary object of this invention is to provide several mechanisms for carrying out the method for reducing the formation of a coherent air bubble.

A further object of this invention is to provide a mechanism for shaping the desired seismic signal by elongating the shape of the air chamber and exhausting the air radially from different positions on the chamber to attenuate secondary pulses.

Another object of this invention is to attenuate the associated seismic bubble pulses and their detrimental effect to seismic exploration.

A still further object of this invention is to provide a seismic pneumatic energy pulse generator with widely dispersed radiating exhaust jets for shaping the primary pulse so that its dominate frequency will be lowered for placing more of the energy into the useful seismic frequency range which results in greater penetration of the seismic signal within the sedimentary section.

Another object of this invention is to provide a seismic pneumatic energy pulse generator which is easy to operate, is of simple configuration, is economical to build and assemble, and is of greater efficiency for generating a primary pulse for greater penetration of the seismic signal within the sedimentary section.

Other objects and various advantages of the disclosed method and seismic pneumatic energy pulse generators for attenuation of secondary pulses in offshore subsurface exploration will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, three forms or mechanisms for carrying out the method of the invention wherein like reference numerals have been employed to indicate similar parts in the several views in which:

FIG. 1 is a schematic sectional view of one embodiment of the new seismic pneumatic energy pulse generator for attenuating secondary pulses;

FIG. 2 is a section at 2—2 on FIG. 1;

FIG. 3 is a pressure amplitude versus time set of typical curves for the embodiment of FIG. 1 as compared to the conventional seismic pneumatic energy pulse generator;

DESCRIPTION OF THE INVENTION

Figure 4:
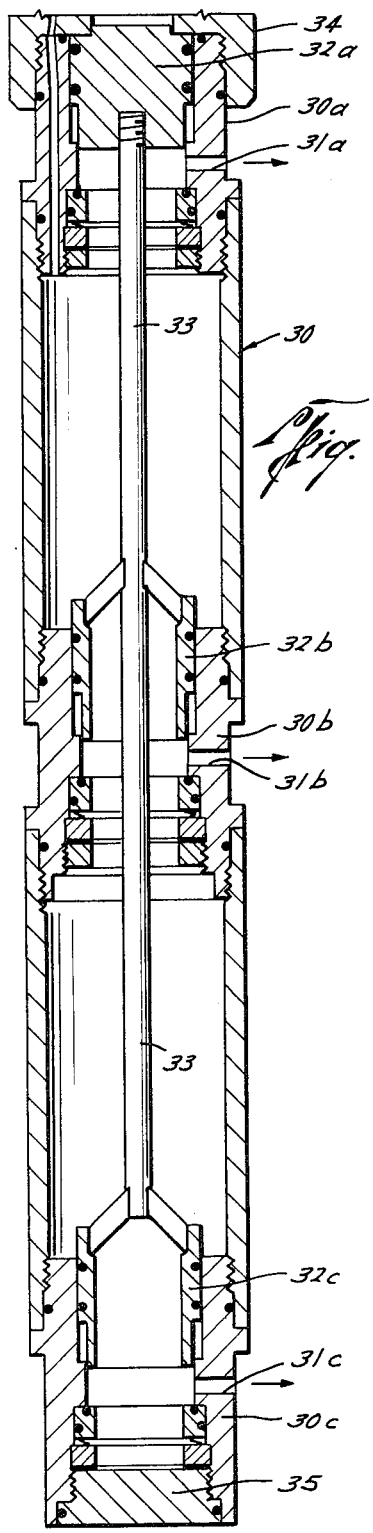
FIG. 4 is a modification of the embodiment of FIG. 1.

The invention disclosed herein, the scope of which being defined in the appended claims, is not limited in its application to the details of construction and arrangement of parts shown and described for carrying out the disclosed method, since the invention is capable of other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations which are within the spirit and scope of the invention herein are included and only such limitations should be imposed as are indicated in the appended claims.

The shape of the primary seismic pulse generated by the discharge of an explosive device, such as but not limited to, an air gun under water is determined primarily by the size of the air gun's port and throat areas, the rate of discharge of the air or gas into the surrounding water, the gas pressure and the reservoir chamber, and the volume of air discharged into the water. If a particular design of air gun is operated at the same air pressure and chamber volume of gas, it can be predicted that the generated primary pulse shape will be repeatable. Changing the charging pressure of the air chamber, other than altering the amplitude of the primary pulse will not have any significant effect on the time duration of the primary pulse.

DESCRIPTION OF THE METHODS

This invention comprises a few methods for attenuating the amplitude and for changing the the period of the bubble or secondary pulses resulting from a primary seismic energy pulse.

One method for attenuating the amplitude and secondary pulses following a primary seismic energy pulse from a container of compressed gas comprises, a. suddenly exhausting the compressed gas, as air for example, in a plurality of jets radiating from a first area into a first radial plane, and b. simultaneously suddenly exhausting more compressed gas in a plurality of jets radiating from a second area of the container widely spaced from the first area and into a second radial plane substantially parallel to the first radial plane for reducing the formation of a coherent gas bubble resulting in attenuation of secondary pulses.

Another method comprises the combination and addition of a third step to the former two steps including simultaneously suddenly exhausting more compressed gas in a plurality of jets radiating from a third area linearly with the first and second areas and widely spaced from the second area, the third set of radiating jets forming a radial plane parallel to the other two radial planes.

Another method comprises the combination and addition of another method step of suddenly exhausting substantially equal amounts of compressed gas from each of the areas.

Still another method for generating a primary seismic pulse with attenuated secondary pulses from a chamber of compressed gas comprises the steps of, a. forming the chamber into an elongated shaped chamber with a plurality of widely spaced apart areas, and b. simultaneously exhausting the compressed gas in jets radiating from each of the areas to reduce the formation of a coherent gas bubble resulting in attenuation of secondary pulses.

A modified method comprises changing the first method step to, a. forming the chamber into an elongated chamber with two, three, or more widely and linearly spaced apart areas.

DESCRIPTION OF THE PULSE GENERATORS

FIG. 1 discloses one embodiment of the invention for carrying out the above disclosed methods for generating a sharp initial or primary pulse followed by greatly attenuated secondary pulses. The seismic pneumatic energy pulse generator or air valve 10, FIG. 1, comprises primarily a high pressure air chamber 11, two sets of upper and lower exhaust ports 12 and 13, and high speed upper and lower valves 14 and 15 for suddenly opening all of the ports. While the disclosed pulse generator is designed primarily for being lowered into a shot hole between 50 and 250 feet for a seismic firing, it also may be utilized for towing under water for offshore subsurface exploration.

FIG. 1 illustrates high pressure air inlet port 11b from which the chamber 11 is charged, and simultaneously smaller chamber 16 of a conventional firing assembly 17 is charged with high pressure air to arm the primary pulse generator. The firing assembly or trigger means for initiating movement of the valve, 14, which is secured, as with screw threads, to the upper cylindrical end 11a of the elongated chamber 11 and sealed with O-ring 17a, 17b, for forming an end cap for one end of the chamber 11 may be any suitable firing assembly, such as but not limited to that disclosed in assignee's copending patent application Ser. No. 160,693, filed July 8, 1971, now U.S. Pat. 3,749,973. The exhaust ports 12, similar to those illustrated in FIG. 3 and described in assignee's above-identified patent, are a plurality of small elongated ports which are flattened in shape with a short dimension in the axial direction of the elongated chamber 11 and which have a long circumferential dimension normal to the radial direction with a ratio of the circumferential dimension to the axial dimension of at least three to one.

Each port 12 comprises a passage radiating outwardly from internally of the chamber 11 in a plane normal to the longitudinal axis of the chamber to an elongated opening on the outer peripheral surface of upper chamber portion 11a. A set of several radial ports, such as but not limited to three ports 12 is utilized. Upper valve 14, FIG. 1, for sealing the ports 12 is preferably a piston valve, as illustrated having O-rings 14a and 14b. With the piston valve 14 in armed position as shown, it abuts sealing ring 19 having O-rings 19a and 19b, backed by spring pressure generating ring 20 with springs 20a, 20b, and locking nut 21 for securing all in position.

The upper end of rod 22, FIG. 1, is fixedly secured, as by screw threads, to piston valve 14 and the rod lower end has four radiating arms 23a, 23b, 23c, and 23d for securing the rod to the sleeve valve 15 slidably mounted in the lower chamber end portion or area 24 secured to the main chamber portion with screw threads and sealed with O-ring 24a, for example, for sealing off the three axially thin, radially wide exhaust ports 13 similar to upper axially thin, radially wide exhaust ports 12. While O-rings 15a and 15b provide a good seal between the sleeve valve 15 and the lower chamber portion 24, sealing ring 26 with O-rings 26a and 26b provide additional sealing aft and below the valve along with spring pressure ring 27 with springs 27a and 27b, and lower cap 28 with O-ring 28a threaded into lower chamber portion 24. The chamber 11 is formed substantially three times as long or deep as its diameter for providing a container holding a great amount of compressed air in a large volume for being lowered in a small bore hole. Likewise, it is exceptionally streamlined for towing offshore in subsurface seismic exploration.

Thus in operation of the disclosed seismic pneumatic energy pulse generator or air valve 10 of FIG. 1, air is admitted downwardly through inlet port 11b to charge the main high pressure air chamber 11 simultaneously with charging of the smaller chamber 16 by a branch pipe (not shown) to the same air pressure. Piston valve 14 is held positively downwardly to cover and close radial exhaust ports 12 due to the larger area and resultant force on the valve top surface as compared to the valve bottom surface. The set of lower radial exhaust ports 13 are closed by sleeve valve 15 connected by rod 22 to piston valve 14. Upon firing of the pulse generator for generating a seismic primary pulse, the piston valve is suddenly actuated upwardly by any suitable means, as by suddenly dropping the pressure in the upper small chamber by the disclosed firing assembly 17. Upward and opening movement of piston valve 14 likewise simultaneously raises and opens sleeve valve 15 to thus open the upper set of radial exhaust ports 12 and the lower set of radial exhaust ports 13 simultaneously. The resulting high pressure air exhausting in all radial directions around the peripheral surface of the upper portion of the chamber and simultaneously exhausting in all radial directions around the peripheral surface of the lower portion of the chamber well spaced from the upper portion forms a very irregular wobbly incoherent air bubble resulting in definite attenuation of all secondary pulses, as illustrated in the pressure amplitude versus time set of typical curves in FIG. 3. It is believed that the resulting reduced formation of a coherent air bubble resulting in attenuation of secondary pulses is due to the simultaneous exhausting of high pressure air radially from the two widely spaced apart areas in the high pressure chamber.

FIG. 2, a sectional view at 2—2 on FIG. 1, illustrates details of the four arm connection with the connecting rod for connecting the sleeve lower valve 15 to the upper piston valve 14 for movement therewith.

FIG. 3 clearly illustrates that while the primary pulse is unaffected by the disclosed elongated shaped, radial exhausting pulse generator, the secondary and detrimental pulses are attenuated.

FIG. 4 illustrates a modification of FIG. 1 wherein the elongated high pressure air chamber or air valve 30 is so long as to comprise three areas or portions 30a, 30b, and 30c, each portion having a set, 31a, 31b, and 31c, respectively, of three ports each, each set of exhaust ports having a valve 32a, 32b, and 32c, respectively, and the three valves being interconnected with a connecting rod 33 for suddenly and quickly opening all exhaust ports simultaneously to generate a seismic primary pulse. With the forward valve 32a being quickly actuated upwardly by a firing assembly 34 as utilized in the embodiment of FIG. 1, valves 32b and 32c are instantly and simultaneously actuated upwardly to the open and exhausting position as illustrated in FIG. 4. While exhaust valve 32a is a piston valve, valves 32b and 32c are sleeve valves for the preferred and most reliable design.

The three chamber portions 30a, 30b, and 30c of the elongated chamber are widely spaced apart. Accordingly with rapid actuation of all valves due to actuation of piston valve 32a by firing assembly 34 as disclosed in FIG. 1, all exhaust ports are opened simultaneously, these exhaust ports radiating in a plane normal to the longitudinal axis of the elongated chamber from the three widely spaced apart chamber portions. The result is the formation or generation of an elongated unsteady bubble or expressed otherwise, the formation of a coherent air bubble is reduced resulting in attenuation of secondary pulses.

It has been discovered as illustrated in FIG. 3, that if a spherically shaped bubble is flattened or elongated so that the diameter or length of the major axis of the bubble is many times greater than the dimension of the bubble on the minor axis, the bubble will collapse with reduced force or impact and, as a result, the amplitude of the generated secondary bubble pulse will be appreciably reduced. This is because the bubble amplitudes are essentially in direct relationship to the smaller dimension of the bubble since the hydrostatic pressure on all surfaces of the bubble is, for all practical purposes, the same. Likewise, the period is lengthened whereby secondary pulses are substantially attenuated.

A lower end cap 35 plugs the lower end of the chamber of the modification of FIG. 4.

Figure 5:
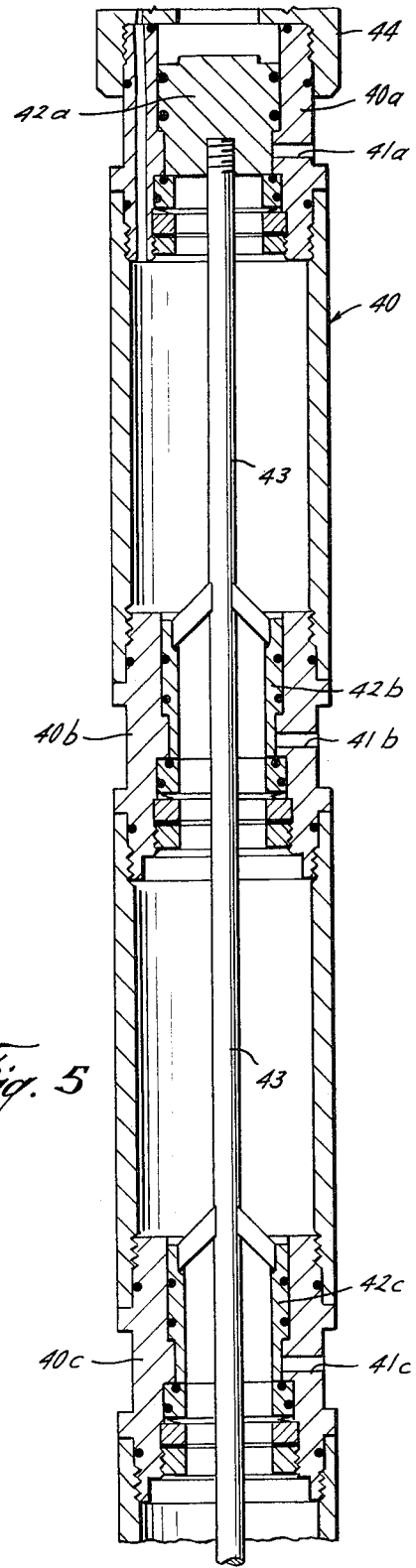
FIG. 5 is another modification of the embodiment of FIG. 1.

FIG. 5 illustrates a third embodiment of the invention which is required for shot holes of a limited diameter but wherein a much larger volume chamber is necessary to generate the required seismic primary pulse. Here the elongated chamber or air valve 40 has more than the three areas or portions 40a, 40b, 40c, etc., illustrated, with a set of exhaust passages and ports 41a, 41b, 41c, etc., respectively, radiating out from each chamber. Each set of exhaust ports is opened by a valve, piston valve 42a, slide valve 42b, slide valve 42c, etc., all valves being connected to the first piston valve 42a with interconnecting rod 43. Preferably these exhaust ports are axially thin and radially wide in shape and radiate outwardly from their respective chamber portions or areas in planes normal to the chamber longitudinal axis, as disclosed in assignee's above identified patent.

The sealing rings, spring pressure rings, locking rings, and piston and sleeve valves in the modifications of FIGS. 4 and 5 are similar to those of FIG. 1. An end cap (not shown) plugs the lower end of chamber or air valve 40. Accordingly, upon sudden actuation of piston valve 42a, FIG. 5, by a firing assembly 44 like that of the embodiment of FIG. 1, all exhaust ports are quickly opened simultaneously to generate a noncoherent, elongated air bubble due to the exhaust ports radiating out from each of the widely spaced apart chamber portions or areas resulting in attenuation of seismic secondary pulses.

Accordingly, it will be seen that the disclosed methods and seismic pneumatic energy pulse generators producing primary bubble pulses with attenuation of secondary bubble pulses amplitude operate in a manner which meets each of the objects set forth hereinbefore by reducing or minimizing magnitude or peak pressures of secondary bubble pulses and oscillations by generating elongated bubbles.

While several methods of the invention and three mechanisms for carrying out the methods have been disclosed, it will be evident that various other methods and modifications are possible in the arrangement and construction of the disclosed methods and seismic pneumatic energy pulse generators for attenuation of secondary pulses without departing from the scope of the invention and it is accordingly desired to comprehend within the purview of this invention such modifications as may be considered to fall within the scope of the appended claims.

We claim:

1. A seismic pneumatic energy generator having a valve means actuated by a trigger means for controlling the exit of gas from exhaust port means in an elongated high pressure gas chamber for generating a primary seismic pulse for subsurface exploration comprising, a. housing means for said high pressure gas chamber, said chamber being cylindrical and having a long axial axis and a short radial axis for the circumference of the cylindrical chamber, b. said chamber having ends, each of said ends being closed with fixed cap means, c. said exhaust port means for said chamber having two longitudinal spaced apart groups of exhaust ports radiating from said chamber, d. said valve means comprising a piston valve means and a sleeve valve means for said two groups of exhaust ports, e. said piston valve means comprising a valve for one group of exhaust ports adjacent one of said fixed cap means, f. means for actuating said piston valve means for quickly opening its group of exhaust ports, g. said sleeve valve means comprising a valve for said other group of exhaust ports adjacent said other fixed cap means, h. all of said exhaust ports being short in the axial direction and long in the circumferential direction normal to the axial direction, i. means for interconnecting said sleeve valve means with said piston valve means, and j. said piston valve means being responsive to said actuating means and said interconnecting means for opening all of said exhaust ports of said exhaust port means simultaneously for reducing the formation of a coherent gas bubble resulting in attenuation of secondary pulses.

2. A seismic pneumatic energy generator as recited in claim 1 wherein, a. said exhaust port means comprises three longitudinally spaced apart exhaust ports in said elongated gas chamber, b. said valve means comprises a valve for each of said spaced apart exhaust ports,
c. said connecting means being a mechanical means for interconnecting all three valves with each other, and
d. said valve means being responsive to said mechanical connecting means for opening all three of said exhaust ports simultaneously.

3. A seismic pneumatic energy generator as recited in claim 1 wherein,
a. said exhaust port means comprises more than two longitudinally spaced apart exhaust ports in said elongated gas chamber,
b. said valve means comprises a valve for each of said spaced apart exhaust ports,
c. said connecting means being a mechanical means for interconnecting all of said valves, and
d. said valve means being responsive to said mechanical connecting means for opening all of said exhaust ports simultaneously.

4. A seismic pneumatic energy generator as recited in claim 1 wherein,
a. each of said two valve means exhausts its plurality of compressed gas jets in a radial plane normal to said chamber longitudinal axis whereby two widely spaced apart radial planes of gas jets formed are substantially parallel to each other.

5. A seismic pneumatic energy generator as recited in claim 1 wherein,
a. said piston valve means exhausts an amount of compressed gas from said first area of said elongated chamber substantially equal to the amount of compressed gas exhausted by said sleeve valve means from a second area of said elongated chamber.

6. A seismic pneumatic energy generator as recited in claim 5 comprising further,
a. third valve means for simultaneously suddenly exhausting more compressed gas in a plurality of jets radiating from a third area linearly with the first and second areas and widely spaced from said first and second areas.

7. A seismic pneumatic energy generator as recited in claim 6 wherein,
a. said three valve means exhaust their respective radial jets into three separate and parallel radial planes.

8. A seismic pneumatic energy generator as recited in claim 6 wherein,
a. said three valve means exhaust substantially equal amounts of compressed gas from each of said three areas.

9. A seismic pneumatic energy generator as recited in claim 5 comprising further,
a. a plurality of valve means for simultaneously suddenly exhausting more compressed gas in a plurality of jets radiating from a plurality of areas linearly spaced from said first and second areas and from each other.

10. A seismic pneumatic energy generator as recited in claim 9 wherein,
a. said plurality of radiating jets from said plurality of areas form a plurality of separate and parallel radial planes normal to said axial axis of said elongated compressed gas chamber.

11. A seismic pneumatic energy generator as recited in claim 9 wherein,
a. said plurality of valve means simultaneously suddenly exhaust substantially equal amounts of compressed gas from each of said plurality of areas.

* * * * *